United States Patent [19]

Shatas

[11] Patent Number: 5,504,540
[45] Date of Patent: Apr. 2, 1996

[54] CONDUCTOR ARRANGEMENT FOR VGA VIDEO CABLES

[75] Inventor: Remigius G. Shatas, Huntsville, Ala.

[73] Assignee: Cybex Computer Products Corporation, Huntsville, Ala.

[21] Appl. No.: 163,993

[22] Filed: Dec. 7, 1993

Related U.S. Application Data

[63] Continuation-in-part of Ser. No. 488,710, Mar. 5, 1990, Pat. No. 5,268,676, which is a continuation-in-part of Ser. No. 447,010, Dec. 5, 1989, Pat. No. 5,193,200, which is a continuation-in-part of Ser. No. 95,140, Sep. 11, 1987, Pat. No. 4,885,718.

[51] Int. Cl.$^6$ ............................................. H04N 7/00
[52] U.S. Cl. .................... 348/844; 395/280; 364/927.92
[58] Field of Search ........................ 348/844, 8; 345/2; 395/325; 364/927.2, 935.2, 935.45, 940, 927.92; 358/84; H04N 7/00

[56] References Cited

U.S. PATENT DOCUMENTS

| | | | |
|---|---|---|---|
| 3,691,295 | 9/1972 | Fisk | 348/13 |
| 4,476,543 | 10/1984 | Quinones et al. | 395/325 |
| 5,030,896 | 7/1991 | Porter et al. | 315/383 |
| 5,089,886 | 2/1992 | Grandmougin | 348/8 |
| 5,299,306 | 3/1994 | Asprey | 395/153 |

Primary Examiner—James J. Groody
Assistant Examiner—Chris Grant
Attorney, Agent, or Firm—C. A. Phillips

[57] ABSTRACT

A cabling arrangement is disclosed for transmitting analog VGA video signals via a cable having insulated conductors and without the use of micro coaxial conductors. In this cable, the red, green, and blue video signals are applied to a first set of conductors grouped against one side of the cable. The horizontal and vertical sync signals are applied to a second set of conductors grouped along an opposite side of the cable. Interposed between the first and second sets of conductors is a plurality of conductors carrying stable potentials, such as ground potentials and identification bit potentials. The separation effected by the interposed conductors, and the interposed conductors themselves, provides effective shielding and isolation of the first and second sets of conductors.

9 Claims, 1 Drawing Sheet

CONDUCTOR ARRANGEMENT FOR VGA VIDEO CABLES

CROSS REFERENCE OF RELATED APPLICATION

This application is a continuation-in-part of application Ser. No. 07/488,710, filed on Mar. 5, 1990, now U.S. Pat. No. 5,268,676 which is a continuation-in-part of application Ser. No. 07/447,010, filed Dec. 5, 1989, now U.S. Pat. No. 5,193,200, which is a continuation-in-part of application Ser. No. 07/095,140, filed Sep. 11, 1987, now U.S. Pat. No. 4,885,718.

FIELD OF THE INVENTION

This invention relates generally to the coupling of video signals between a computer and monitor and particularly to a video cabling system for transmitting analog VGA computer video signals over conductors which are not discretely shielded against radiated interference.

BACKGROUND OF THE INVENTION

In the applications that most personal computers are used today, the computer is controlled by a keyboard through which an operator provides instructions that cause the computer to operate on selected software. In turn, and responsive to these operations, the computer provides information via video signals that are received and displayed on a cathode ray tube of a monitor. These video signals, from any particular IBM compatible personal computer, are of one type of several types of video signals, the types of video signals commonly in use today including MDA, CGA, EGA, VGA, super VGA, and XGA. For the MDA, CGA, and EGA types, the video signals consist of at least two digital, TTL level video signals for carrying the video information. A digital, TTL level horizontal sync (HS) signal and a digital, TTL level vertical sync (VS) signal are transmitted with the video signals to provide synchronization.

The VGA and XGA signals each consist of analog color red (R), green (G), and blue (B) video signals which vary from 0 volts to about 700 millivolts, with a corresponding ground return for each video signal. As with the digital signals described above, a digital, TTL level horizontal sync (HS) signal and a digital, TTL level vertical sync (VS) signal are transmitted with the color video signals, which are each provided with a discrete ground return. Additionally, three identification signals in the form of identification bits, or ID BITS, are transmitted. These ID BITS are positive 5 volt logic potentials provided by the computer on the three ID BIT lines. The monitors of each of the types of video signals are provided with means for operating on each of the ID BIT lines to selectively pull each of the +5 volt logic potentials LOW or leave it at a HIGH state, with each monitor type having a unique combination of LOWs and HIGHs of the ID BITS. The computer senses the particular coding of the "ID bits" of each type, and provides the appropriate signals for that type VGA monitor.

Typically, the video, sync signals and ground return potentials are coupled from the computer to the monitor via a multi-conductor cable, with conductors carrying the video signals, and in some instances the conductors carrying the sync signals, being micro coaxial conductors each having a discrete shield enclosing the conductor to shield the video and sync conductors from radiated interference. These cables having micro coaxial conductors therein are relatively expensive, and the coaxial conductors are more difficult to connect to terminals of plugs during the manufacturing process because the shield of each of the coaxial conductors must be separately coupled to a ground potential, typically through a pin terminal of the plug. Additionally, electrical insulation between the shield and video or sync conductor must be stripped away prior to connecting the conductor to a pin terminal or socket terminal of the interfacing plug. Further, the thin coaxial center conductors are much less durable and more prone to breakage, typically at a terminal of a connector, than ordinary stranded wire that makes up the other non-coaxial conductors of the cable.

In order to eliminate use of these more expensive video cables and the attendant problems of micro coaxial conductors, applicant has developed cabling systems as disclosed in U.S. patent application Ser. No. 07/488,710, filed on Mar. 5, 1990, and which is incorporated herein by reference, and U.S. Pat. No. 4,885,718. In these disclosures, the concept has emerged to use a cable having all non-shielded, electrically insulated, stranded conductors, and to isolate the video and sync conductors from conductors carrying the keyboard, mouse, and other digital signals, allowing a less-expensive cable to be used to collectively carry the video, mouse, and keyboard signals. This is done by arranging coupling of discrete conductors with respect to the various signals such that there are conductors in the cable carrying reference ground and power potentials interposed between the video and sync signals, and the keyboard, mouse, and other computer signals, effectively isolating the video and sync signals from the keyboard, mouse, and other signals.

With increasing popularity and use of VGA computer systems, a newer, different system for coupling analog VGA computer video signals from a source of VGA signals to equipment for directing these signals was devised, and introduced in a system for general sale to the public by Cybex Corporation of Huntsville, Ala., about four years ago. In this newer system, the cable carrying the VGA video signals is a BELDEN (TM) P/N 9935 or equivalent, which has an outer plastic sheath, a braided metallic shield just inside the outer sheath, a metallic foil shield inside the braided shield, and ten electrically insulated, color coded conductors inside the braided shield. Eight of these conductors are concentrically positioned along the inner side of the shield, and are coded, in a clockwise direction, red, green, blue, purple, orange, brown, gray, and yellow. The remaining two conductors are coded white and black, and are axially positioned within the eight concentric conductors together with cords or threads of filler material. As is commonly done in cable construction, the relative positions of the outer eight conductors spirals in one direction along the cable, with the inner two conductors twisted around each other to spiral in an opposite direction coaxially with respect to the outer eight conductors. This arrangement prevents the cable from having a tendency to curl.

For ease of identification during manufacture of video cables from this type of cable, the conductors coded red, green, and blue were selected to carry the analog red, green, and blue video signals, which as stated, are positioned next to each other in the concentrically arranged conductors. Other conductors carry the video-related signals and return potentials, with the center conductors, which are color coded black and white, carrying a video ground and the horizontal sync signal, respectively.

While this system worked relatively well, one perplexing problem was that a faint, thin, vertical white line predominantly visible on screen images having dark backgrounds appeared in the video image of some monitors, particularly those used in the IBM PS/2 Model 95 (TM) series computer systems. In spite of this, cables using this method of VGA signal transmission were successfully utilized for the next two years, until it became practical to procure custom-molded cables, at which time the use of Belden type 9935 cable was discontinued. However, the problem with respect to the faint, thin white line persisted.

The cause of this vertical white line was found after a shipment of custom-molded cable was received wherein the white conductor, which carries the HS signal, was incorrectly laid directly adjacent to the blue conductor, which carries the blue video signal. The resulting video cables manufactured from this cable caused a relatively bright blue vertical line to appear in the image of the monitor. After the incorrect conductor lay of this cable was discovered, the blue line was recognized as digital interference radiated from the horizontal sync signal conductor into the blue video signal conductor. Here, as the VGA HS signal is a digital, TTL level signal ranging from a LOW logic state of below about 0.8 volts to a HIGH logic state of above 2.0 volts, with very fast digital transitions in the low nanosecond range, it was found that the digital transitions of the HS signal were inducing interference of up to about 200 millivolts into the blue video conductor. As the blue video signal is an analog signal of only about 0–700 millivolts peak-to-peak, the induced 200 millivolt noise was more than sufficient to generate a blue line as seen on the monitor image.

With this discovery, it was then realized that the faint vertical white line seen in some systems having the correctly coded cables as described above was also caused by the horizontal sync signal, which was applied to the white, centrally located conductor. Here, the opposed spiral of the two center conductors with respect to the outer, concentric conductors brings the white conductor into close proximity with the red, green, and blue video conductors at three or four points along an eight foot video cable. This caused enough radiated interference from the horizontal sync conductor to be picked up by the R, G, and B video conductors and cause the faint white line.

It is, therefore, an object of this invention to provide a video cable for coupling computer VGA video and video related signals, and vertical and horizontal sync signals, by non-shielded, stranded conductors of a video cable such that the video conductors are shielded against radiated interference from the sync conductors by interposed conductors carrying the video related signals and return potentials.

SUMMARY OF THE INVENTION

A video source having discrete terminals for providing analog red, green, and blue color video signals, horizontal and vertical synchronization signals, and stable signals is provided. A cable having a plurality of insulated, non-shielded conductors is also provided, which cable having first and second ends, with a first end of the conductors each coupled to a respective terminal of the video source. The conductors of the cable are each coupled at an opposite end to respective terminals of a receiver for receiving the signals, with the red, green, and blue signals unadulterated by the synchronization signals.

DETAILED DESCRIPTION OF THE DRAWINGS

Figure 1:
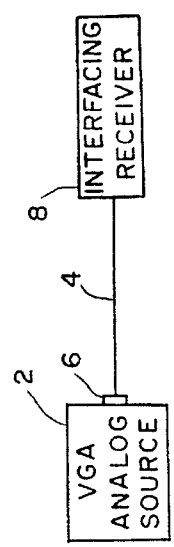
FIG. 1 is a block diagram of a system in which a video cable of the present invention is used.

Referring initially to FIG. 1, a source 2 of computer analog VGA signals is shown. This source 2 may be a personal computer, or may be equipment for switching or routing computer video signals to various locations. A cable 4 having a plurality of separate conductors is coupled via a plug 6 to terminals of source 2 which pass discrete VGA video, video related signals, and sync signals, and passes the VGA signals to an interfacing receiver 8. Receiver 8 may be signal conditioning circuitry for conditioning the video signals, or switching and routing circuitry adapted to pass the video signals to a selected location. In some of these applications, cable 4 may be one of a plurality of cables for collectively carrying mouse and keyboard signals, and which are coupled at one end to discrete mouse, keyboard, and video ports of a computer. At the other end, these separate cables terminate in a single plug coupled to computer signal switching circuitry, as disclosed in application Ser. No. 08/129,772, filed on Sep. 29, 1993, and which is incorporated herein by reference.

Figure 2:
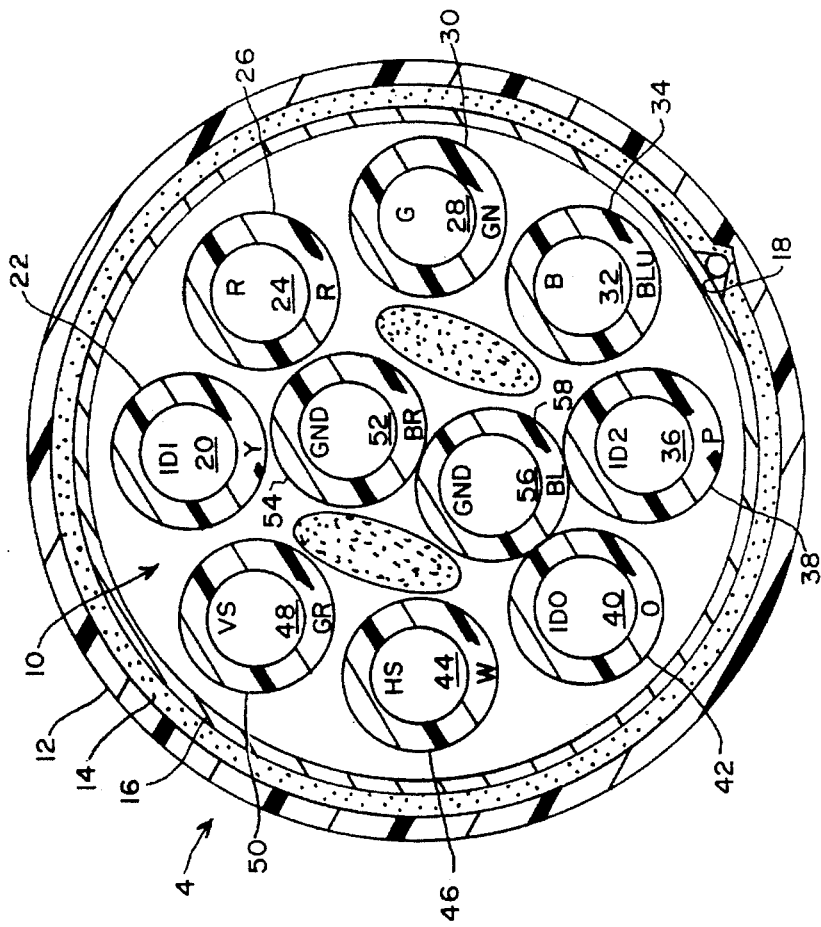
FIG. 2 is a cross sectional view of a video cable of the present invention showing the relative positioning of conductors carrying particular video and video related signals, and sync and ground signals and potentials.

Referring now to FIG. 2, a cross sectional view of cable bundle 4 of the present invention is shown. This type of cable has 10 electrically insulated conductors 10 and is equivalent in capacitance and shielding to Belden cable P/N 9935, but differs in that there is a customized lay, or ordering, of the color coding of each of the ten conductors. Otherwise, cable 4 has a protective plastic outer sheath or jacket 12, with a braided metallic shield 14 inside sheath 12. A metallic foil shield 16 is positioned inside braided shield 14, with a drain conductor 18 positioned between and in contact with the braided shield and the foil shield. Shields 14 and 16 block external electric fields from inducing current flows in the conductors 10 of cable 4, and additionally reduce radiated electromagnetic field strength, with any current flows generated in the foil and braided shields being drained to ground via conductor 18. Each of conductors 10 is a stranded wire conductor consisting of seven strands of 32-gauge wire twisted together to form a stranded conductor equivalent to a solid 24-gauge conductor.

The customized lay for the color coded conductors is as shown and described in FIG. 2. Here, and beginning with conductor 20 in the 12 o'clock position, the insulative coating or covering 22 thereof is provided with a yellow color, as designated by the letter Y on covering 22, with this conductor selected to carry the second of three stable, video related potentials known as ID BITS. As defined above, these three potentials are provided by the computer, and are selectively either left at a HIGH logic state or shorted to ground by the monitor, resulting in a LOW logic state. The particular combination of HIGH and LOW logic states on the ID BIT lines indicates to the computer the type of VGA monitor attached thereto. As such, the three ID BITS provide information to the computer in the form of stable, selected potentials.

The next conductor in a clockwise direction from conductor 20 is conductor 24, which has an insulative covering 26 of a red color, as designated by the letter R. Logically, this conductor is selected to carry the red video signal (R), which is readily associated with the red color of the insulative covering, assisting in the identification of this conductor and its correct location on the plug interfacing to a computer during the manufacturing process. Likewise, the next conductor, conductor 28, is provided with an insulative covering 30 of a green color designated GN, which conductor carrying the green video signal (G) for reasons as described with respect to the red video conductor. The same is also true for the next conductor 32, which has an insulative covering 34 of a blue color designated BLU, and which carries the blue video signal (B). Significantly, the red, green, and blue conductors form a first set or group of conductors on one side of the cable, which set carrying the color video signals.

The next conductor in a clockwise direction is conductor 36 having a covering 38 of a purple color, designated P, which conductor being selected to carry the third ID BIT, with the next conductor 40 provided with an orange covering 42 designated O. Conductor 40 carries the first ID BIT.

Continuing in the clockwise direction, conductor 44 has a covering 46 of a white color, designated W, this conductor carrying the horizontal sync signal (HS), and the next adjacent to conductor 48 having a covering 50 of a gray color, designated GR, this conductor carrying the vertical sync signal (VS). These white and gray conductors form a second set or group of conductors on the opposite side of the cable from the first set, and carry the sync signals.

Of the two center conductors, conductor 52 is provided with a covering 54 having a brown color, designated BR, with this conductor carrying a logic ground potential reserved for self-test use. The adjacent conductor 56 has a covering 58 of a black color, designated BL, this conductor also carrying a signal ground potential which serves as a return for the sync and video signals.

At this point, it will be appreciated upon examining FIG. 2 that the first set of conductors 24, 28, and 32 carrying the red, green, and blue video signals, respectively, are separated from the second set of conductors 44 and 48 carrying the HS and VS signals by conductors 20, 52, 56, 40, and 36, which each carries either an ID BIT or a signal ground reference potential. These potentials are stable potentials that do not change, and serve to isolate the video conductors from the conductors carrying the HS and VS signals. This prevents interference from conductors 44 and 48 from being induced into conductors 24, 28, and 32. The description of FIG. 2 assumes looking at the cable from one end, and it is to be understood that a view taken from the opposite end would show a reversal of the color coded conductors. Further, it is to be understood that the relative positions of the outer 8 conductors spiral in one direction through the cable, while the axially positioned inner conductors spiral about each other in opposite directions. This is insignificant inasmuch as the relative positions of the first and second sets of conductors remain at all points along the cable on opposed sides thereof, with the conductors carrying stable potentials being interposed between the two sets of conductors as shown in FIG. 2.

Figure 3:
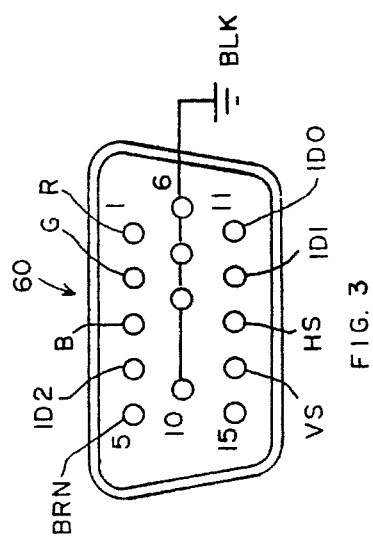
FIG. 3 is an end view of a connector for coupling VGA video and video related signals between a VGA video source and an interfacing receiver, and which is adapted to be plugged into a mating connector of the source.

Referring now to FIG. 3, an end view of a high density Subminiature "D" connector or plug 60 is shown, which plug 60 adapted to be coupled to a mating subminiature "D" connector (not shown) mounted to source 2. Conventionally, the connector mounted to source 2 is a female type plug having socket terminals for receiving male type pin terminals of plug 60, with the video and video related signals being applied to specific pins in the plug as defined by IBM for the VGA and XGA video signal standards. In accordance with these standards, pins 1, 2, and 3 carry the R, G, and B video signals, respectively, with pin 4 carrying the third ID BIT. Pin 5 is reserved for self-test use, and pins 6, 7, and 8 are the R, G, and B return terminals, respectively. As will be noted in FIG. 2, pins 6, 7, and 8 are conveniently located adjacent to pins 1, 2, and 3, respectively, so that where a conventional video cable having coaxial video conductors is used, the braided shields of the R, G, and B conductors may conveniently be connected to these adjacent return terminals. The location of pin 9 is a keyed position not containing a pin, and pin 10 carries a grounded sync return potential. In the third row of pins, pin 11 carries the first ID BIT, and pin 12 carries the second ID BIT. Pin 13 carries the HS signal, and pin 14 carries the VS signal. As with the R, G, and B video signals, pins 13 and 14 are positioned proximate pin 10 so that the braided shields of coaxial conductors coupled to pins 13 and 14 may be conveniently connected to pin 10. Pin 15 is reserved for future use.

Applicant has connected his 10-conductor cable to plug 60 in accordance with the VGA standard in the following manner. Pins 1, 2, and 3 are coupled to the red, green, and blue video conductors, respectively, which carry the R, G, and B video signals. Pin 4 is connected to the purple conductor carrying the third ID BIT, and pins 11 and 12 are coupled to the orange and yellow conductors carrying the first and second ID BITS, respectively. Pins 13 and 14 are coupled to the white and gray conductors, which carry the HS and VS signals, respectively. A jumper is connected between pins 6, 7, 8, and 10, as illustrated by a solid line connecting these pins to the black ground conductor coupled to all these pins via the jumper. Pin 5 is connected to the brown conductor. At the opposite end of the cable, the black and brown conductors are coupled to logic ground, a filtered ground potential. As described, only 10 unshielded, stranded conductors are needed to carry the VGA video signals, reducing manufacturing costs of producing VGA video cables and also making applicant's video cables more durable by using only stranded conductors rather than the thin coaxial conductors which are prone to breakage.

After having described my invention and the manner of its use, it is apparent that incidental changes may be resorted to that fairly fall within the scope of the following appended claims, wherein I claim:

1. A video transmission system comprising:
   a video source including discrete terminals for discretely providing red, green, and blue analog signals, vertical and horizontal synchronization signals, and stable signals;
   a cable having first and second ends and comprising a plurality of conductors extending between said first and second ends, and each conductor connecting to a respective terminal of said terminals of said source at said first end;
   said conductors having an insulative, non-shielding material separating each conductor from another of said conductors;
   said conductors carrying said red, green, and blue analog signals being isolated from said conductors carrying said vertical and horizontal synchronization signals by said conductors carrying said stable signals; and
   receiving means having other terminals coupled to said conductors at said second end of said cable for providing said red, green, and blue signals significantly unadulterated by said synchronization signals.

2. A video transmission system as set forth in claim 1 wherein said video source is a VGA signal source.

3. A video signal transmission system as set forth in claim 2 wherein said stable signals include identification signals and ground potentials.

4. A video signal transmission system as set forth in claim 3 wherein said cable contains 10 conductors.

5. A video signal transmission system as set forth in claim 3 wherein said source and said cable are connected by a generally rectangular receptacle-plug combination having first, second, and third rows of said terminals and wherein said red, green, and blue signals are connected to said terminals in said first row, one of said conductors carrying one of said ground potentials is commonly connected to said terminals of said second row, and other of said signals are connected to said terminals of said third row, and said second row is positioned between said first and third rows.

6. A system as set forth in claim 1 wherein said conductors are separated in groups in terms of a first group for said analog signals, a second group for said synchronization signals, and a third group for said stable signals, and said conductors of each said group being positioned with respect to conductors of another said group wherein said analog signals are significantly unadulterated by said synchronization signals.

7. A method for transmitting analog VGA video signals comprising:

providing a cable having a plurality of electrically insulated, non-shielded, stranded conductors generally circularly arranged in said cable;

providing a video source comprising R, G, and B color video signals, and VS and HS synchronization signals, and a plurality of stable potentials;

coupling said R, G, and B video signals to discrete ones of a first set of said conductors passing along a first side of said cable;

coupling said VS and HS signals to discrete ones of a second set of said conductors passing along a second side of said cable opposed from said first side of said cable; and coupling said stable potentials to those said conductors interposed between said first set and said second set of said conductors, whereby said first set of said conductors and said second set of said conductors are shielded from each other by said conductors interposed between said first set and said second set of said conductors.

8. A method as set forth in claim 7 wherein said step of providing a cable includes the step of providing a cable having conductors.

9. A method as set forth in claim 7 further comprising the step of coupling ground return potentials of said R, G, and B signals and ground return potentials of said VS signal and said HS signal to a single one of said conductors.

* * * * *